(12) United States Patent
Suzuta et al.

(10) Patent No.: US 9,010,492 B2
(45) Date of Patent: Apr. 21, 2015

(54) LUBRICATION STRUCTURE FOR ENGINE

(75) Inventors: Masayoshi Suzuta, Wako (JP);
Katsuhiko Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 13/432,039

(22) Filed: Mar. 28, 2012

(65) Prior Publication Data

US 2012/0247875 A1 Oct. 4, 2012

(30) Foreign Application Priority Data

Mar. 31, 2011 (JP) ................................. 2011-080604

(51) Int. Cl.
*F16H 57/04* (2010.01)

(52) U.S. Cl.
CPC .......... *F16H 57/043* (2013.01); *F16H 57/0423* (2013.01)

(58) Field of Classification Search
CPC ................... F16H 57/0421; F16H 57/0423
USPC ................... 184/6.21, 6.12; 74/606 R; 464/7
See application file for complete search history.

(56) References Cited

U.S. PATENT DOCUMENTS

| 1,533,641 | A | * | 4/1925 | Baits et al. .................... 74/343 |
| 2,049,234 | A | * | 7/1936 | Thomas et al. .............. 184/11.1 |
| 3,605,946 | A | | 9/1971 | Oehl |
| 4,222,283 | A | * | 9/1980 | Nagy ................................ 74/467 |
| 4,231,266 | A | * | 11/1980 | Nishikawa et al. ............. 74/467 |
| 4,242,923 | A | * | 1/1981 | Nishikawa et al. ........... 475/160 |
| 4,329,887 | A | * | 5/1982 | Kawamoto ..................... 74/467 |
| 4,359,142 | A | * | 11/1982 | Schultz et al. ............... 184/11.1 |
| 4,359,909 | A | | 11/1982 | Sogo |
| 4,480,493 | A | * | 11/1984 | Takahashi ...................... 74/467 |
| 4,501,167 | A | * | 2/1985 | Saito ............................... 74/467 |
| 4,745,816 | A | * | 5/1988 | Horiuchi et al. ................ 74/467 |
| 4,834,219 | A | * | 5/1989 | Inagaki et al. .................. 184/6.5 |
| 4,987,974 | A | * | 1/1991 | Crouch ......................... 184/6.12 |
| 5,651,425 | A | * | 7/1997 | Hill et al. ..................... 184/6.12 |
| 7,331,423 | B2 | * | 2/2008 | Inoue et al. .................. 184/6.12 |
| 7,513,172 | B2 | * | 4/2009 | Takahashi et al. .............. 74/467 |
| 7,984,791 | B2 | * | 7/2011 | Taguchi et al. .............. 184/6.12 |
| 8,602,935 | B2 | * | 12/2013 | Katoh et al. .................. 475/159 |
| 2008/0178834 | A1 | * | 7/2008 | Ishida et al. .................. 123/196 |

(Continued)

FOREIGN PATENT DOCUMENTS

| JP | 38-23811 Y | 11/1963 |
| JP | 63-166608 U | 10/1988 |

(Continued)

*Primary Examiner* — William E Dondero
*Assistant Examiner* — Minh Truong
(74) *Attorney, Agent, or Firm* — Birch, Stewart, Kolasch & Birch, LLP

(57) ABSTRACT

A lubrication structure is provided for supplying lubricating oil to a transmission of an engine. The engine includes a mission holder which includes a power transmission mechanism between a main shaft and a countershaft as a unit and is removably mounted in a mission chamber, and a clutch chamber having a clutch mechanism is provided adjacent the mission chamber for transmitting rotation of a crankshaft to the transmission. Two oil introduction ports are provided on the mission holder, which is between the clutch chamber and the mission chamber. The two oil introduction ports enable the two chambers to communicate with each other. Each of the oil introduction ports has an opening provided therein which opens upwardly on a clutch chamber side of the mission holder.

18 Claims, 7 Drawing Sheets

(56) References Cited

U.S. PATENT DOCUMENTS

| | | | |
|---|---|---|---|
| 2009/0165587 A1* | 7/2009 | Ariga et al. | 74/467 |
| 2010/0043594 A1* | 2/2010 | Hilker et al. | 74/607 |
| 2010/0282013 A1* | 11/2010 | Fujimoto et al. | 74/467 |
| 2011/0076165 A1* | 3/2011 | Atarashi et al. | 417/321 |
| 2011/0245010 A1* | 10/2011 | Nobata et al. | 475/160 |

FOREIGN PATENT DOCUMENTS

| | | |
|---|---|---|
| JP | 2004-308775 A | 11/2004 |
| JP | 2008-025669 A | 2/2008 |

* cited by examiner

US 9,010,492 B2

LUBRICATION STRUCTURE FOR ENGINE

CROSS-REFERENCE TO RELATED APPLICATION

The present application claims priority under 35 U.S.C. §119 to Japanese Patent Application No. 2011-080604, filed Mar. 31, 2011. The entire contents of the above-identified application are hereby incorporated by reference.

BACKGROUND OF THE INVENTION

1. Field of the Invention

The present invention relates to a lubrication structure for an engine, and particularly to a lubrication structure for an engine which includes a cartridge type mission gear mechanism.

2. Description of Background Art

In a lubricating system in a conventional mission gear mechanism, a path for lubricating oil supply to a main shaft (countershaft) and a countershaft (driving shaft) of the lubricating system in the mission gear mechanism is configured normally from a path or a groove formed in a wall portion of a mission case or in a wall thickness portion of a mission holder (mission case cover), and supply of lubricating oil to the main shaft or the countershaft is carried out through a predetermined branching path portion or the like from an engine main gallery.

Further, since the route of the lubricating oil path formed so as to extend through the inside of the wall of the mission case or in the wall thickness portion or the mission holder is complicated, it is frequently formed as an opening of the path which is open in an end wall portion of the mission case or the mission holder. The path opening which is in the open state is closed by suitable means to form a path for lubricating oil supply, and supply of lubricating oil to the main shaft or the countershaft is carried out frequently through such a branching path portion as described above.

Further, a structure is disclosed wherein, in the formation of the oil supplying path described above, the path opening is closed by attachment of the mission holder to form an oil supplying path (see, for example, Japanese Patent Laid-Open No. 2004-308775).

In this manner, in the conventional lubricating oil supplying path to a mission gear mechanism, not only a structure of forming a complicated oil supplying path in a mission case or a mission holder is adopted but also a forced lubricating system such as an oil jet is required. As a result, there is a subject of complication of a crankcase and increase of the number of parts.

SUMMARY AND OBJECTS OF THE INVENTION

The present invention has been made in view of such a situation as described above, and it is an object of the present invention to provide a lubrication structure for an engine with which complication of a mission case, a crankcase or the like can be avoided.

According to an embodiment of the present invention, a lubrication structure for an engine includes a transmission including speed reducing gear mechanisms disposed between a main shaft and a countershaft and a shift drum for carrying out gear change of the speed reducing gear mechanism and a clutch mechanism for transmitting rotation of a crankshaft to the transmission, and a mission chamber for accommodating the transmission as a unit therein and a clutch chamber which includes the clutch mechanism being segmented by a mission holder in a crankcase. Lubricating oil, supplied to the transmission, is configured such that oil introduction ports for communicating the clutch chamber and the mission chamber with each other are provided between the chambers. The oil introduction ports have openings opened upwardly on the clutch chamber side.

According to an embodiment of the present invention, the oil introduction port is provided on the mission holder; an oil path communicating with the oil introduction port is provided in the crankcase; and a mission opening communicating, with the oil path and a mission accommodation section is provided substantially at the center of the crankcase in the widthwise direction.

According to an embodiment of the present invention, the countershaft is disposed on the upper side with respect to the main shaft; and the mission opening of the oil path to the mission accommodation section is positioned just above the main shaft.

According to an embodiment of the present invention, an end portion of the countershaft of the mission holder is open and is configured so as to form the oil introduction port.

According to an embodiment of the present invention, a hollow portion of the countershaft configures an oil path.

According to an embodiment of the present invention, the oil introduction ports include reception wall bottom face portions in which the openings are swollen to the inner side of the clutch chamber to introduce oil to the oil introduction ports.

According to an embodiment of the present invention, extension wall portions configured from wall faces opposing to each other in the clutch rotation direction and connecting to the oil introduction ports are provided on the reception wall bottom face portions.

According to an embodiment of the present invention, the oil path is communicated with a mission breather path of the mission chamber.

Effects of the Invention Include the Following:

According to an embodiment of the present invention, the lubricating oil in the form of mist or liquid drops floating in the clutch chamber by rotation of the clutch in the clutch chamber can be recovered by the opening which is open upwardly, and the recovered oil can be supplied from the oil introduction port into the mission chamber.

According to an embodiment of the present invention, the lubricating oil can be supplied from the mission holder, in which the oil introduction port is positioned rather near to the side of the crankcase, through the mission opening provided substantially at the center in the crankcase widthwise direction past the oil path into the mission accommodation section. Consequently, the lubricating oil can be introduced from the mission holder to the shaft center side and efficiently lubricate the main shaft.

According to an embodiment of the present invention, since the mission opening of the oil path to the mission accommodation section is positioned just above the main shaft, the lubricating oil supplied from the oil path can be introduced effectively to the main shaft and efficiently lubricate the main shaft.

According to an embodiment of the present invention, the lubricating oil can be supplied readily from the opening of the bearing portion through the countershaft, and the oil supplying structure is simplified. Further, since the countershaft is positioned above the main shaft, the lubricating oil can be supplied from the countershaft to the main shaft.

According to an embodiment of the present invention, the lubricating oil can be supplied very easily from the opening of the bearing portion into the mission accommodation section through the hollow portion of the countershaft, and the oil supplying structure is simplified.

According to an embodiment of the present invention, the lubricating oil which floats in the clutch chamber can be received by the reception wall bottom face portion which is swollen to the inner side of the clutch chamber. Consequently, the lubricating oil can be recovered and introduced to the oil introduction ports and then supplied.

According to an embodiment of the present invention, the lubricating oil scattered by rotation of the clutch can be collected not only by the reception wall bottom face portion but also by the extension wall portions. Therefore, the lubricating oil can be collected and supplied to the mission accommodation section more effectively.

According to an embodiment of the present invention, since the oil path is communicated with the mission breather path of the mission chamber, the path volume of the mission breather path can be increased, and this can contribute to improvement of the engine output power and the response in a high rotational speed region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
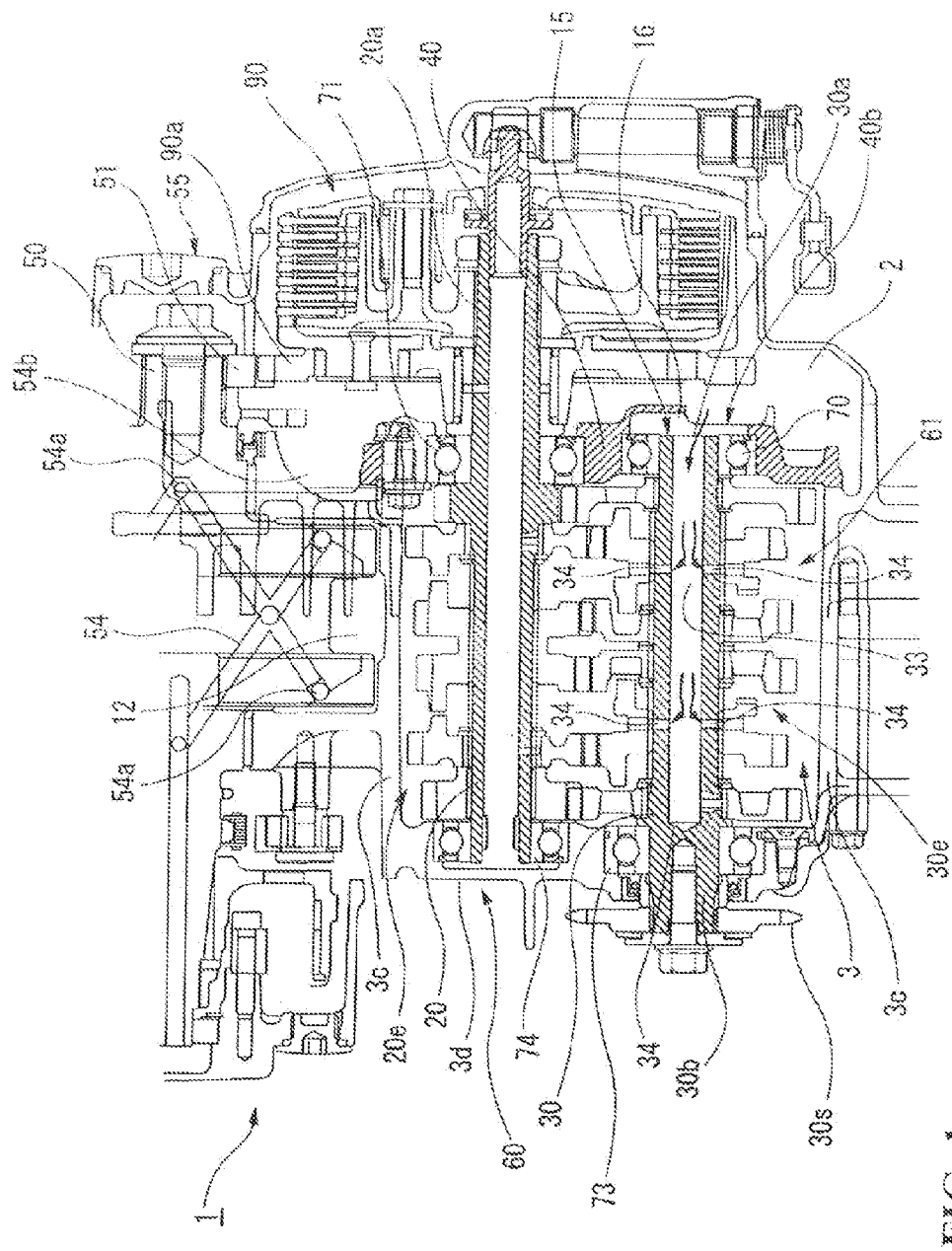
FIG. 1 is a sectional view taken in a direction along a crankshaft showing a principal structure of an engine according to the present invention.

In the following, an embodiment of the present invention is described in detail with reference to FIGS. 1 to 7. In the description of the present embodiment, an engine of a motorcycle is described particularly. It is to be noted that the drawings are to be viewed from a direction of reference characters.

FIG. 1 is a sectional view showing a structure section around a transmission 60 of the engine 1 in the present embodiment, and part of a crankshaft 50 and a crankcase 55, a clutch mechanism 90, a mission gear mechanism 61 and so forth are shown.

Then, as shown in FIG. 1, a primary driving gear 51 is mounted at an end of the crankshaft 50 of the engine 1, and this primary driving gear 51 meshes with a primary driven gear 90a on a main shaft 20. The clutch mechanism 90 is interposed between the primary driven gear 90a and the main shaft 20.

A speed reducing gear train 20e of the mission gear mechanism 61 is mounted on the main shaft 20 and meshes with a speed reducing gear train 30e of a countershaft 30 (driveshaft), and the countershaft 30 is driven by a gear-shifted speed reducing ratio. A driving sprocket wheel 30s is fixed to a left end 30b of the countershaft 30 and power is transmitted to a driving, wheel for vehicle driving not shown through a chain.

The crankshaft 50 is supported for rotation on the crankcase 55 through a bearing section. Further, the main shaft 20 and the countershaft 30 are supported for rotation through bearings 73 and 74 provided adjacent each other on the crankcase 55 and hearings 70 and 71 provided on a mission holder 40, respectively. Then, a mission chamber 3 and a clutch chamber 2 are defined independently of each other by the mission holder 40. Here, the mission chamber 3 is configured such that the shafts are surrounded by a mission chamber side wall 3c configured from a side wall of the crankcase 55. The mission chamber 3 is formed such that it is suitably closed on a shaft end side thereof by the mission holder 40.

Figure 3:
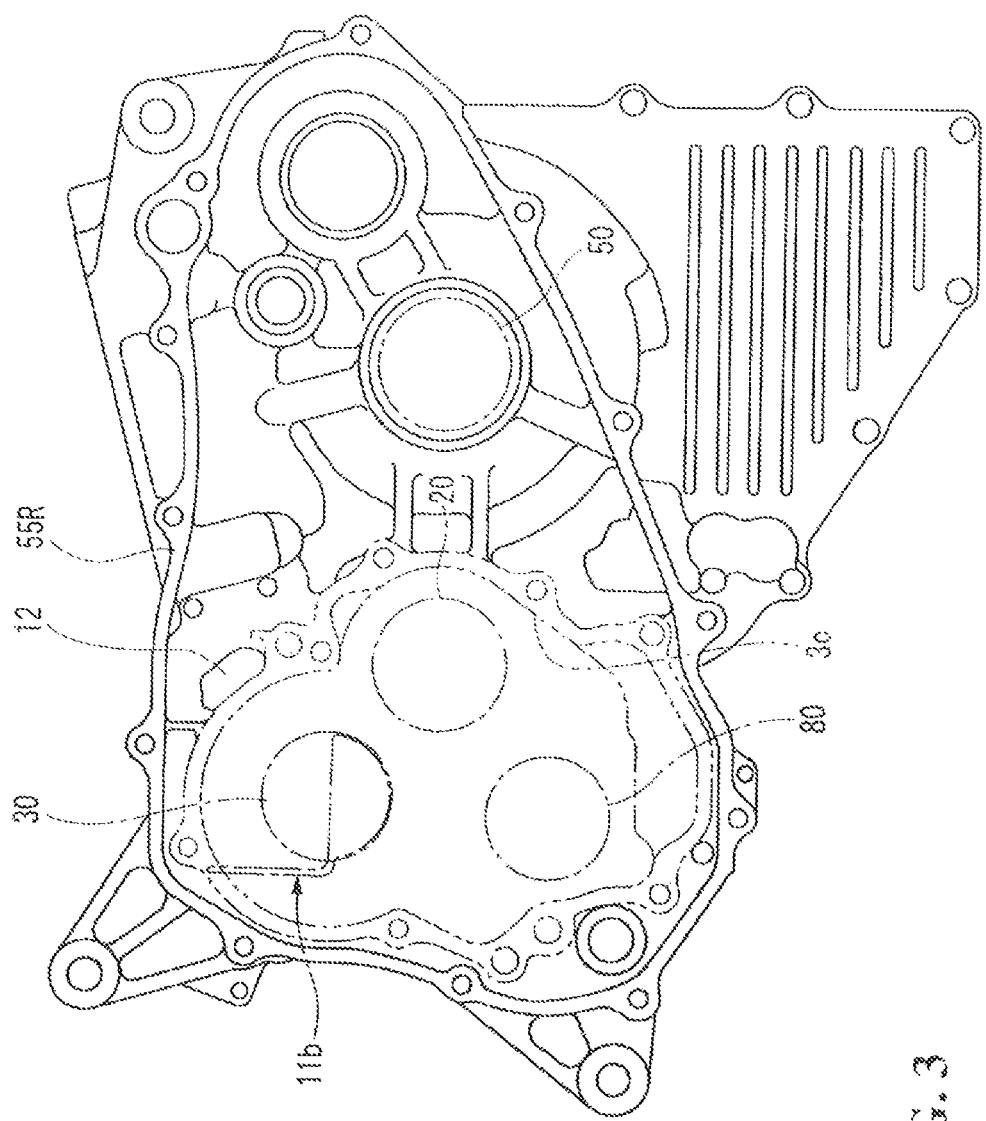
FIG. 3 is a side elevational view showing the inner side of a right half of the crankcase shown in FIG. 1.
Figure 4:
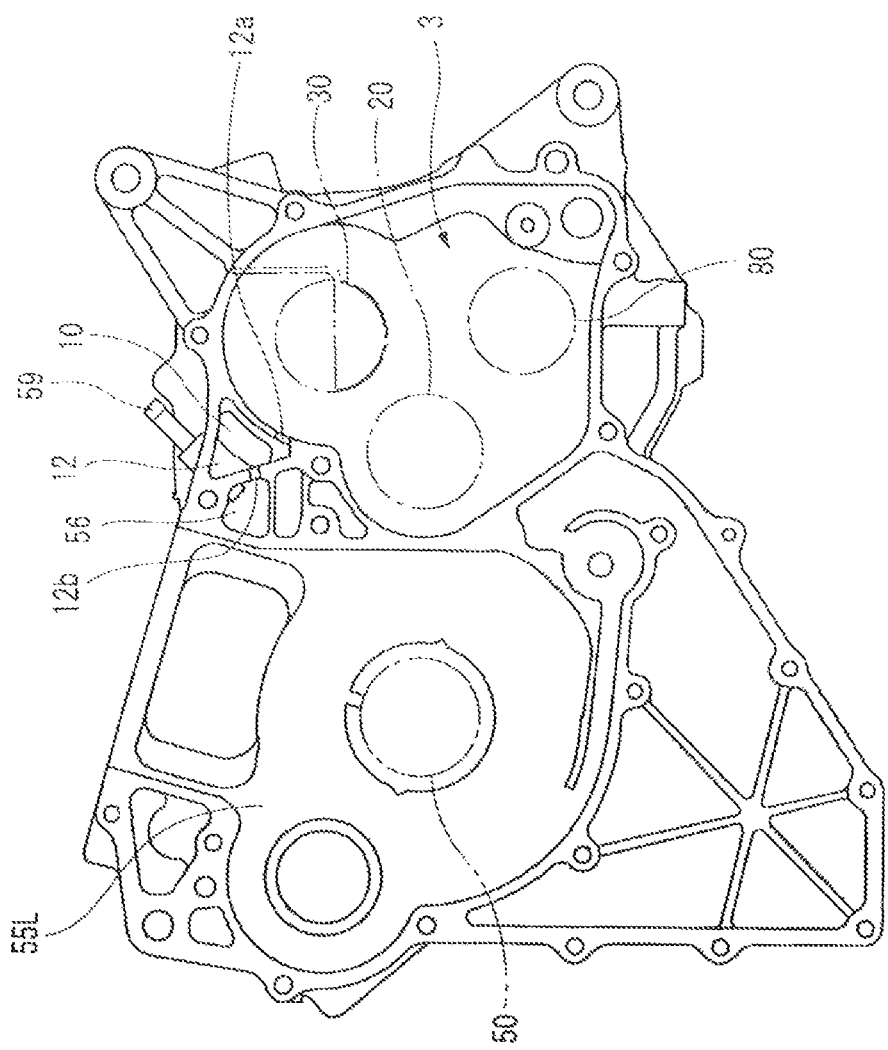
FIG. 4 is a side elevational view showing the inner side of a left half of the crankcase shown in FIG. 1.

It is to be noted that the crankcase 55 is configured from a combination of a right case 55R shown in FIG. 3 and a left case 55L, shown in FIG. 4.

Further, regarding the main shaft 20, a shaft end 20a at a right end thereof shown in FIG. 1 extends from the mission holder 40 through the inside of the clutch chamber 2, and the primary driven gear 90a and the clutch mechanism 90 are attached to the shaft end 20a.

Further, regarding the countershaft 30, the driving sprocket wheel 30s described above is fixed to a shaft end 30b at a left end thereof, but oil introduction ports 10 and 15 (refer to FIG. 2) hereinafter described which are covered by one half by the mission holder 40 and supported on the bearing 70 are provided at the shaft end portion 30a at the right end.

Lubricating structures of the engine 1 and the mission gear mechanism 61 in the present embodiment are described below.

It is to be noted that an oil filter not shown is attached to a suitable location on the lower side of the crankcase 55 and an oil cooler not shown is attached to the front face on the lower side of the crankcase 55, for example, forwardly of the cylinder, and a main gallery 54 is provided below the crankshaft 50 of the crankcase 55. Further, an oil supplying path 54a or the like communicating with the main gallery 54 is suitably opened.

Thus, lubricating oil sucked up from an oil pan by suction of an oil pump is supplied to the main gallery 54 through the oil filter and the oil cooler and suitably past a supplying path. Then, the lubricating oil is supplied to the bearing portions of the crankshaft 50 through oil supplying paths 54a branching from the main gallery 54 and are used for lubrication of the bearing portions.

In the present embodiment, the mission chamber 3 for accommodating the transmission 60 in a unit therein and the clutch chamber 2 including the clutch mechanism 90 are defined by the mission, holder 40 in the crankcase 55. Further, the mission chamber 3 has a space formed therein and surrounded by a mission chamber side wall 3c which is a side wall of the crankcase 55, an outer side wall 3d (left side in FIG. 1) of the crankcase 55 and the mission holder 40. The clutch chamber 2 including the clutch mechanism 90 described above for transmitting rotation of the crankshaft 50 to the transmission 60 is provided adjacent the mission chamber 3.

Thus, supply of the lubricating oil to the transmission 60 is carried out by a lubrication structure described below through the clutch chamber 2.

First, lubricating oil supplied from the main gallery 54 to the bearing portions of the crankshaft 50 through the oil supplying path 54a is supplied from a communicating portion 54b of the crankcase 55 to the clutch chamber 2.

Figure 2:
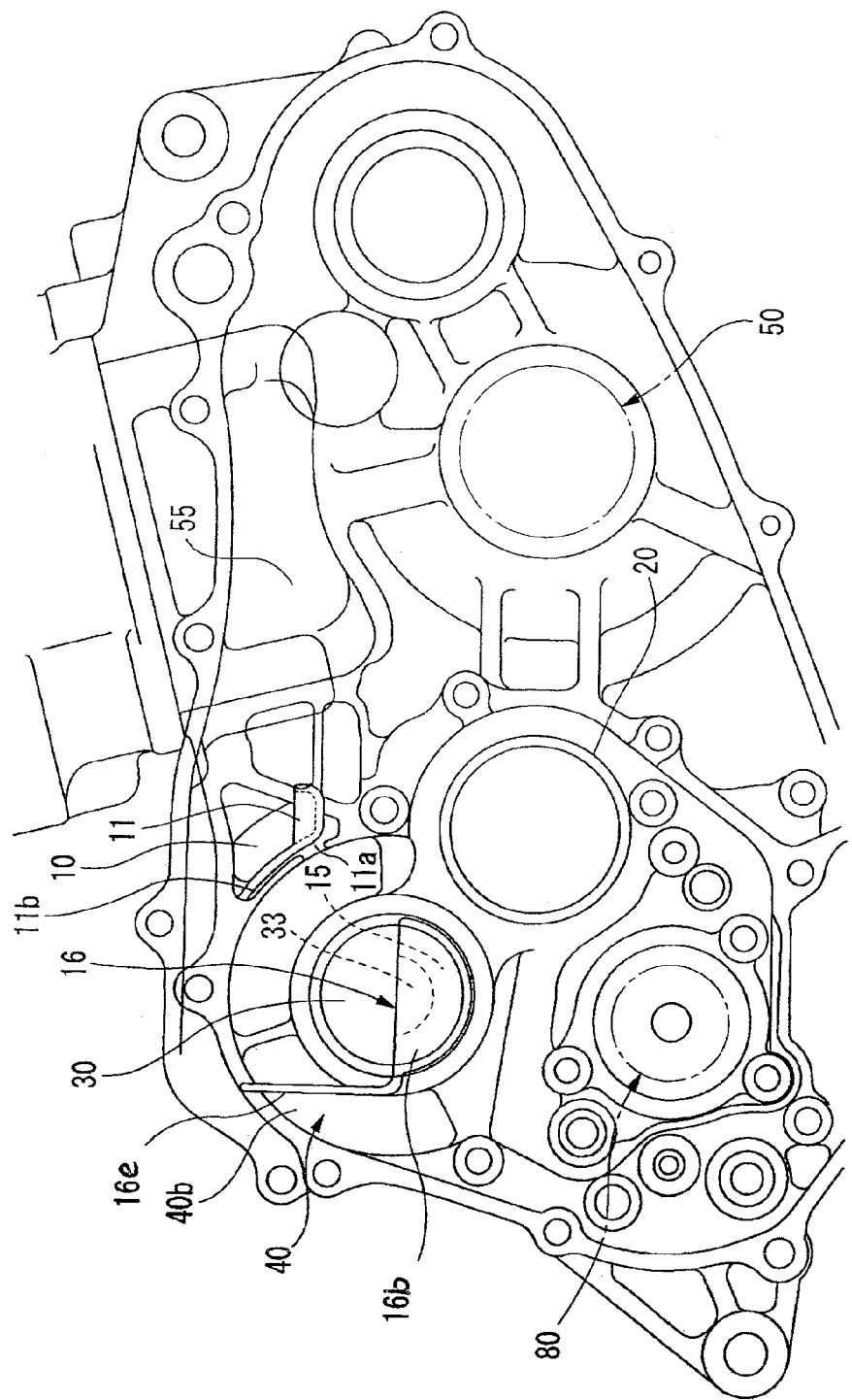
FIG. 2 is a side elevational view of essential part showing a mission holder shown in FIG. 1 as viewed from a sideward direction.

Here, in the present embodiment, two oil introduction ports 10 and 15 for communicating the clutch chamber 2 and the mission chamber 3 with each other are provided between the chambers as shown in FIG. 2. In particular the two oil introduction ports 10 and 15 are provided so as to open to a clutch chamber side wall face 40b of the mission holder 40. Further, the oil introduction ports 10 and 15 include openings 11 and 16 (refer to FIGS. 5 and 7) which are open upwardly on the clutch chamber 2 side, respectively.

Figure 5:
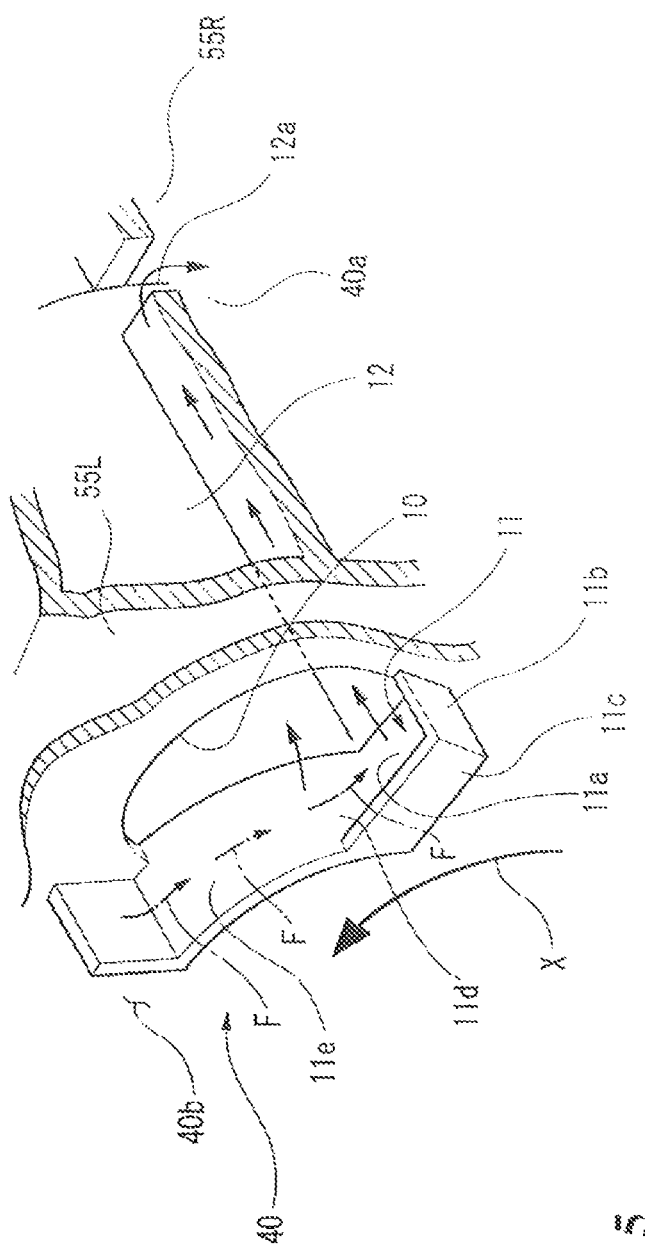
FIG. 5 is a perspective view, partly in section, showing the mission holder and the crankcase for showing an oil path in the crankcase and an oil introduction port according to present invention.

As shown in FIG. 5, in the oil introduction port 10, a reception wall bottom face portion 11a on which the opening 11 swells to the inner side of the clutch chamber 2 and reception wall side face portions 11b, 11c and 11d provided so as to surround the reception wall bottom face portion 11a are provided. Accordingly, the opening 11 has a configuration that it swells upwardly from the clutch chamber side wall face 40b.

Figure 7:
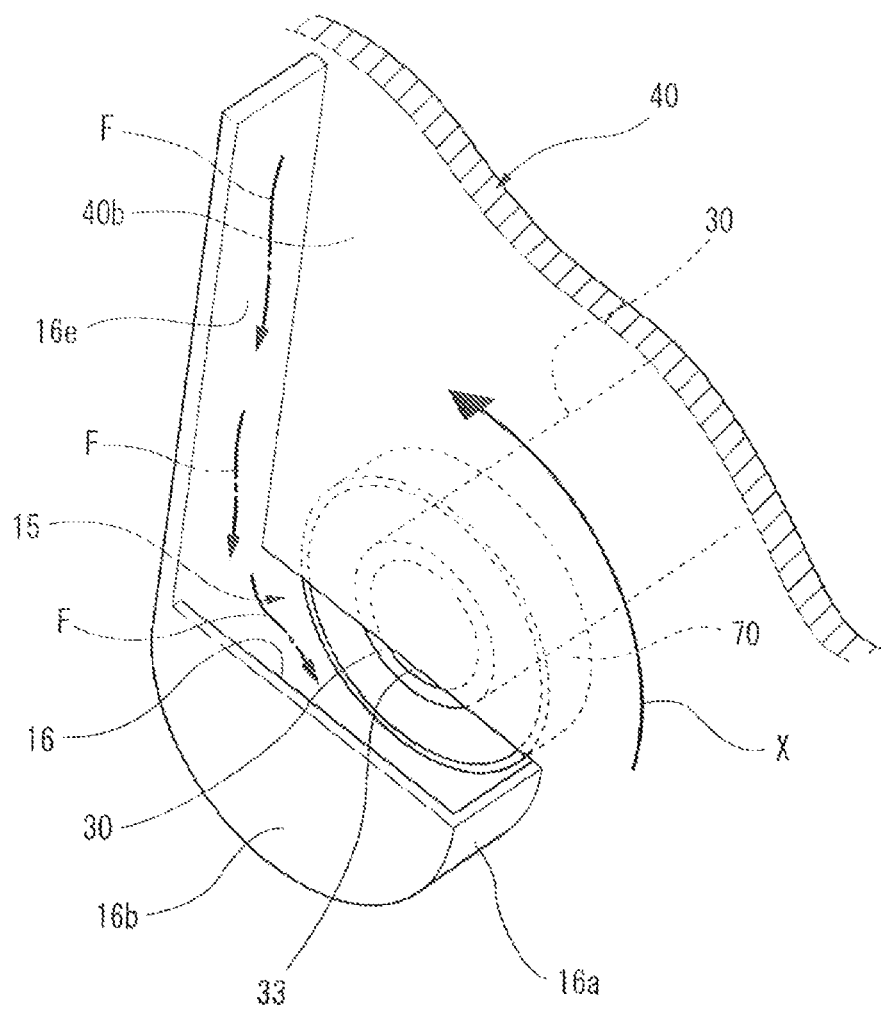
FIG. 7 is a partial perspective view of the mission holder showing an opening to the countershaft and the oil introduction port according to the present invention.

Further, as shown in FIG. 7, in the oil introduction port 15, an arcuate reception wall bottom face portion 16a on which the opening 16 swells to the inner side of the clutch chamber 2 and a semi-circular reception wall side face portion 16b provided so as to surround the reception wall bottom face portion 16a are provided. Accordingly, also the opening 16 has a configuration wherein it swells upwardly from the clutch chamber side wall face 40b.

In the present embodiment, while the oil introduction port 10 is provided on the mission holder 40 as shown in FIG. 2, it is structured so as to communicate with the oil path 12 formed on the crankcase 55 side.

In particular, as shown in FIG. 5, the oil path 12 communicating with the oil introduction port 10 is provided in the crankcase 55 (shown as the left case 55L and the right case 55R in FIG. 5), and the crankcase 55 includes a mission opening 12a communicating with the mission chamber 3 in the mission holder 40. Further, the oil path 12 is formed in a crankcase transverse direction in both of the left and right cases 55R and 55L of the crankcase 55 such that it has a substantially triangular cross sectional shape.

Further, the mission opening 12a is formed as a cutaway on the end face side of the left case 55L as shown in FIGS. 4 and 5 and is formed as an opening when both of the left and right cases 55R and 55L are combined.

Further, in the present embodiment, the countershaft 30 is disposed on the upper side with respect to the main shaft 20. Further, as shown in FIG. 4, the mission opening 12a is positioned just above the main shall 20 and is configured so as to supply lubricating oil to a central portion of the main shaft 20.

Figure 6:
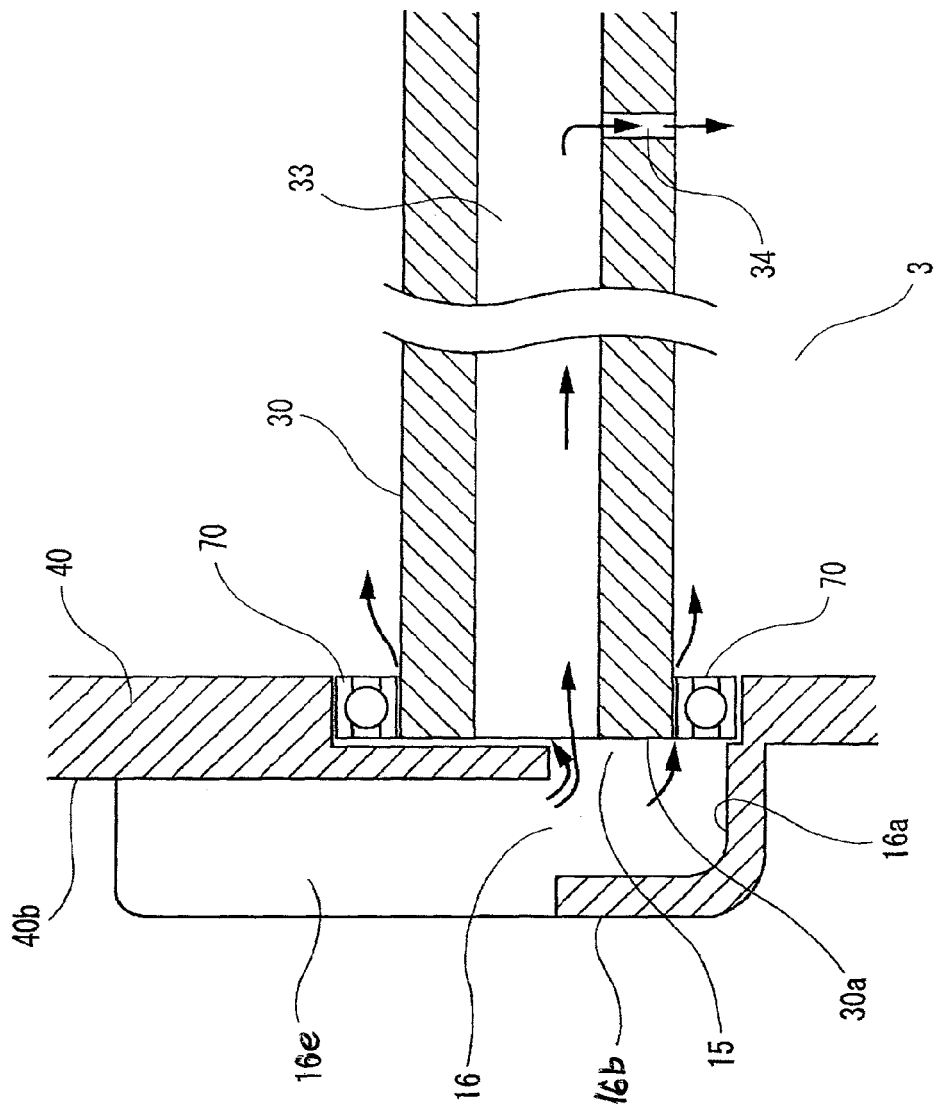
FIG. 6 is a sectional view showing an oil path in a countershaft and the oil introduction port according to the present invention.

Further, as shown in FIGS. 6 and 7, the lubrication structure in the present embodiment is configured such that an end portion 30a (refer to FIGS. 1 and 6) of the countershaft 30 of the mission holder 40 is open to form the oil introduction port 15. Further, a hollow portion of the countershaft 30 is configured as an oil path 33, and a communication path 34 which communicate from the oil path 33 to the mission chamber 3 is provided.

The lubricating oil supplied to the clutch chamber 2 is agitated by rotation of the clutch mechanism 90 and floats in the clutch chamber 2 while rotating in a mist state or a liquid drop state in a rotating direction of the clutch.

Accordingly, since the oil introduction ports 10 and 15 include the openings 11 and 16 open upwardly on the clutch chamber 2 side, respectively, the lubricating oil floating in the clutch chamber 2 can be received by the reception wall bottom face portion 11a which is swollen to the inner side of the clutch chamber 2. Consequently, the lubricating oil can flow (flow in a direction of an arrow mark F in FIGS. 5 and 7) on the wall face and can be collected and supplied to the oil introduction port 10.

Further, on the reception wall bottom face portions 11a and 16a, extension wall portions 11e and 16e formed from will faces opposing to each other in the clutch rotation direction and continuing to the oil introduction ports 10 and 15 are provided, respectively. By the configuration wherein the extension wall portions 11e and 16e are provided, the lubricating oil scattered by clutch rotation can be captured over an increased area by the extending wall portions 11e and 16e and the reception wall bottom face portion 11a, and the lubricating oil can be collected effectively.

Further, since the mission holder 40 is configured such that the end portion 30a of the countershaft 30 which is the hollow portion is open to form the oil introduction port 10, the lubricating oil can be supplied very easily from the opening of the beating portion to the gears through the oil path 33 of the countershaft 30 past the communication path 34, and complication of the oil supplying structure is avoided. Further, shaft rotating force can be utilized for oil supply from the communication path 34 of the countershaft 30, and consequently, very effective supplying can be achieved.

Further, in the present embodiment, since the countershaft 30 is disposed on the upper side with respect to the main shaft 20, the lubricating oil supplied to the countershaft 30 can flow through the main shaft 20. Further, since the mission opening 12a of the oil path 12 is positioned just above the main shaft 20, the lubricating oil can be supplied directly to the shaft central portion of the main shaft 20, and lubrication can be implemented efficiently.

In this manner, with the embodiment, lubricating oil in the form of mist or liquid drops floating in the clutch chamber by rotation of the clutch in the clutch chamber 2 is recovered by the opening 11 which is open upwardly. This recovered lubricating oil is supplied into the mission chamber 3 by a simple structure from the oil introduction ports 10 and 15 through the oil paths 12 and 33. Besides, as the structure for introducing the lubricating oil from the mission holder 40 side to the shaft center side, the oil path 12 which can be formed simply and readily and the oil path 33 of the hollow portion of the countershaft 30 are adopted. Therefore, such complication as in the conventional crankcase is avoided.

Further, in the present embodiment, the oil path 12 is provided adjacent the mission breather path 56 of the mission chamber 3 and is communicated with the mission breather path 56 through a communication path 12b which extends through the wall face as shown in FIG. 4. It is to be noted that, when the communication path 12b is to be formed, it can be formed simply by a simple configuration of only cutting away an end face of the left case 55L. It is to be noted that the mission breather path 56 has a connection pipe 59 connected thereto which connects to an air cleaner.

Since the oil path 12 and the mission breather path 56 are connected to each other by the communication path 12b in this manner, the path volume of the mission breather path 56 can be increased, and this can contribute to improvement of the engine output power and the response in a high rotational speed region.

While the present invention has been described in connection with the embodiment wherein it is applied to a motorcycle, the present invention is not limited to this, but can be applied to saddle-type vehicles including, for example, not only a two-wheeled vehicle but also a three-wheeled vehicle (three-wheeled buggy) and a four-wheeled buggy and other internal combustion engines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubrication structure for an engine which includes a transmission including speed reducing gear mechanisms disposed between a main shaft and a countershaft, a shift speed variation mechanism for carrying out gear change of the speed reducing gear mechanism, and a clutch mechanism for transmitting rotation of a crankshaft to the transmission, the lubrication structure comprising:
a mission chamber for accommodating the transmission as a unit therein and a clutch chamber which includes the clutch mechanism being segmented by a mission holder in a crankcase, lubricating oil being supplied to the transmission,
first and second oil introduction ports provided so as to open to a clutch chamber side wall face of the mission holder, thereby enabling the lubricating oil to communicate between the clutch chamber and the mission chamber; and
each of the first and second oil introduction ports having an opening which opens upwardly on a side of the clutch chamber,
wherein the countershaft is supported for rotation through bearings provided on the mission holder,
wherein the counter shaft includes an oil passage, and
the mission holder includes the clutch chamber side wall face which can be seen to only partially cover the oil passage when the structure is viewed from a right side.

2. The lubrication structure for an engine according to claim 1, wherein the first oil introduction port is provided on the mission holder;
a first oil path communicating with the first oil introduction port is provided in the crankcase; and
a mission opening communicating with the first oil path and a mission accommodation section is provided substantially at a center of the crankcase in a widthwise direction.

3. The lubrication structure for an engine according to claim 2, wherein the countershaft is disposed on an upper side with respect to the main shaft; and
the mission opening of the first oil path to the mission accommodation section is positioned just above the main shaft.

4. The lubrication structure for an engine according to claim 2, wherein the opening of each of the first and second oil introduction ports includes a reception wall bottom face portion which is swollen to an inner side of the clutch chamber to introduce the oil, respectively, to the first and second oil introduction ports.

5. The lubrication structure for an engine according to claim 2, wherein the first oil path is communicated with a mission breather path of the mission chamber.

6. The lubrication structure for an engine according to claim 1, wherein an end portion of the mission holder is open and is configured to form the second oil introduction port.

7. The lubrication structure for an engine according to claim 6, wherein a hollow portion of the countershaft provides the oil passage within the countershaft.

8. The lubrication structure for an engine according to claim 1, wherein the opening of each of the first and second oil introduction ports includes a reception wall bottom face portion which is swollen to an inner side of the clutch chamber to introduce the oil, respectively, to the first and second oil introduction ports.

9. The lubrication structure for an engine according to claim 8, wherein the reception wall bottom face portion of the opening of each of the first and second oil introduction port includes an extension wall portion,
wherein the extension wall portions are configured from wall faces opposing to each other in a clutch rotation direction, and connect, respectively, to the first and second oil introduction ports.

10. A lubrication structure for an engine which includes a transmission including speed reducing gear mechanisms disposed between a main shaft and a countershaft and a shift speed variation mechanism for carrying out gear change of the speed reducing gear mechanism and a clutch mechanism for transmitting rotation of a crankshaft to the transmission, the lubrication structure comprising:
a mission chamber for accommodating the transmission as a unit therein and a clutch chamber which includes the clutch mechanism being segmented by a mission holder in a crankcase, lubricating oil being supplied to the transmission,
first and second oil introduction ports are provided so as to open to a clutch chamber side wall face of the mission holder, thereby enabling the lubricating oil to communicate between the clutch chamber and the mission chamber;
wherein each of the first and second oil introduction ports has an opening which opens upwardly on a clutch chamber side of the mission holder, and
the countershaft is supported for rotation through bearings provided on the mission holder,
wherein the counter shaft includes an oil passage, and
the mission holder includes the clutch chamber side wall face which can be seen to only partially cover the oil passage when the structure is viewed from a right side.

11. The lubrication structure for an engine according to claim 10, wherein the first oil introduction port is provided on the mission holder;
a first oil path communicating with the first oil introduction port is provided in the crankcase; and
a mission opening communicating with the first oil path and a mission accommodation section is provided substantially at a center of the crankcase in a widthwise direction.

12. The lubrication structure for an engine according to claim 11, wherein the countershaft is disposed on an upper side with respect to the main shaft; and
the mission opening of the first oil path to the mission accommodation section is positioned just above the main shaft.

13. The lubrication structure for an engine according to claim 11, wherein the opening of each of the first and second oil introduction ports includes a reception wall bottom face portion which is swollen to an inner side of the clutch chamber to introduce the oil, respectively, to the first and second oil introduction ports.

14. The lubrication structure for an engine according to claim 11, wherein the first oil path is communicated with a mission breather path of the mission chamber.

15. The lubrication structure for an engine according to claim 10, wherein an end portion of the mission holder is open and is configured to form the second oil introduction port.

16. The lubrication structure for an engine according to claim 15, wherein a hollow portion of the countershaft provides the oil passage within the countershaft.

17. The lubrication structure for an engine according to claim 10, wherein the opening of each of the first and second oil introduction ports includes a reception wall bottom face portion which is swollen to an inner side of the clutch chamber to introduce the oil, respectively, to the first and second oil introduction ports.

18. The lubrication structure for an engine according to claim 17, wherein the reception wall bottom face portion of the opening of each of the first and second oil introduction port includes an extension wall portion,
  wherein the extension wall portions are configured from wall faces opposing to each other in a clutch rotation direction, and connect, respectively, to the first and second oil introduction ports.

* * * * *